(12) United States Patent
Myers et al.

(10) Patent No.: US 8,868,962 B2
(45) Date of Patent: Oct. 21, 2014

(54) MONITORING CIRCUIT AND METHOD

(75) Inventors: James Edward Myers, Cambridge (GB); David Walter Flynn, Cambridge (GB); Bal S Sandhu, San Jose, CA (US)

(73) Assignee: ARM Limited, Cambridge (GB)

( * ) Notice: Subject to any disclaimer, the term of this patent is extended or adjusted under 35 U.S.C. 154(b) by 125 days.

(21) Appl. No.: 13/368,383

(22) Filed: Feb. 8, 2012

(65) Prior Publication Data

US 2013/0202008 A1     Aug. 8, 2013

(51) Int. Cl.
*G06F 1/04*     (2006.01)
*G01K 7/00*    (2006.01)

(52) U.S. Cl.
USPC ............................ 713/503; 374/179; 702/124

(58) Field of Classification Search
None
See application file for complete search history.

(56) References Cited

U.S. PATENT DOCUMENTS 6,462,625 B2 * 10/2002 Kim .................................. 331/57
7,560,998 B2 *  7/2009 Ohta et al. ........................ 331/57
7,831,873 B1 * 11/2010 Trimberger et al. ........... 714/725

FOREIGN PATENT DOCUMENTS

JP           63076452 A  *  4/1988  ................ 257/E27.1

* cited by examiner

*Primary Examiner* — Lisa Caputo
*Assistant Examiner* — Nasir U Ahmed
(74) *Attorney, Agent, or Firm* — Nixon & Vanderhye P.C.

(57) ABSTRACT

A monitoring circuit for an integrated circuit comprises a non-temperature-inverted circuit and a temperature-inverted circuit. Operating parameters of the two circuits are measured, representing the propagation speed of signals in the respective circuits. In response to a change in temperature, the non-temperature-inverted circuit slows down and the temperature-inverted circuit speeds up. In contrast, in response to a change in operating voltage both circuits either speed up or slow down. This divergence in response to temperature and similar response to voltage enables the monitoring circuit to distinguish between changes in operating voltage and changes in operating temperature.

20 Claims, 9 Drawing Sheets

MONITORING CIRCUIT AND METHOD

BACKGROUND OF THE INVENTION

1. Field of the Invention

The present invention relates to the field of integrated circuits. In particular, the invention relates to monitoring at least one of an operating temperature and an operating voltage of an integrated circuit.

2. Description of the Prior Art

The signal propagation delay through elements of an integrated circuit may vary over time in response to changes in operating temperature or operating voltage of the integrated circuit. Also, the signal propagation delay can vary from circuit to circuit due to variation in process conditions when manufacturing the circuit (for example changes in temperature or humidity during the manufacturing process). Therefore, the performance of an integrated circuit may vary from time to time and between different circuits or different regions of a circuit. A monitoring circuit may be provided to monitor changes in operating conditions, to gain visibility of the likely performance of the integrated circuit. For example, the monitoring circuit may be placed in a region of interest of the integrated circuit and may measure the propagation delay through a replica circuit element, which can be assumed to track the delay through real circuit elements of the surrounding region of the integrated circuit.

One problem with such monitoring circuits is that it can be difficult for a monitoring circuit to distinguish a change in operating temperature from a change in operating voltage. A decrease in operating temperature and an increase in operating voltage both tend to speed up the propagation speed of signals in a typical monitoring circuit, and so it can be difficult to determine the relative contribution of temperature and voltage for a given change in propagation speed. The present technique seeks to provide a monitoring circuit which can distinguish changes in operating temperature from changes in operating voltage.

SUMMARY OF THE INVENTION

Viewed from one aspect, the present invention provides a monitoring circuit for monitoring at least one of an operating temperature and an operating voltage of an integrated circuit, said monitoring circuit comprising:

a non-temperature-inverted circuit configured to propagate a first signal with a propagation speed which decreases with increasing operating temperature and increases with increasing operating voltage;

a temperature-inverted circuit configured to propagate a second signal with a propagation speed which increases with increasing operating temperature and increases with increasing operating voltage;

a first measuring circuit configured to measure a first operating parameter indicative of said propagation speed of said first signal in said non-temperature-inverted circuit; and a second measuring circuit configured to measure a second operating parameter indicative of said propagation speed of said second signal in said temperature-inverted circuit;

wherein said first operating parameter and said second operating parameter are indicative of said operating temperature and said operating voltage.

The monitoring circuit of the present technique exploits a phenomenon called temperature inversion in order to distinguish changes in operating temperature from changes in operating voltage. Traditionally, the switching speed of a circuit element such as a transistor varies inversely with temperature so that a temperature increase causes the switching speed to decrease. However, in recent technologies tending towards smaller process feature sizes it has been found that some transistors can exhibit temperature-proportional switching speeds, such that the switching speed increases in response to a temperature increase. This phenomenon is known as temperature inversion.

Hence, any particular circuit may be considered to be either a temperature-inverted circuit, for which signal propagation is faster at a higher temperature than at a lower temperature, or a non-temperature-inverted circuit, for which signal propagation is faster at lower temperature than at a higher temperature. Whether a particular circuit displays temperature inversion or not depends on factors such as the configuration of transistors within the circuit, the gate voltage applied to the transistors, and the threshold voltage of the transistors. Typically, a transistor will exhibit temperature inversion if a voltage below an inversion boundary voltage is applied to the transistor. Typically, the inversion boundary voltage is higher for transistors with higher threshold voltages than for transistors with lower threshold voltages. Hence, different circuits can be designed to display temperature inversion or not by using appropriate transistors which are configured to be inverted or non-inverted.

Previously, temperature inversion has generally been regarded as a nuisance because circuits which have been tested on the assumption that switching speeds will decrease with increasing temperature now have to be re-tested for the temperature inversion condition in which switching speeds increase with increasing temperature. This requires more characterisation for technology libraries and greater analysis effort (for example increased use of techniques such as static timing analysis).

However, the present technique recognises that the phenomenon of temperature inversion can be useful for distinguishing voltage effects and temperature effects in an integrated circuit. The present technique provides a monitoring circuit which comprises two circuits: a non-temperature-inverted circuit which propagates a first signal at a propagation speed which decreases with increasing operating temperature and increases with increasing operating voltage, and a temperature-inverted circuit which propagates a second signal with a propagation speed which increases with increasing operating temperature and increases with increasing operating voltage. First and second measuring circuits are provided to measure operating parameters indicating the propagation speed of the signals in the non-temperature-inverted circuit and the temperature-inverted circuit respectively.

Since one circuit is non-temperature-inverted and the other circuit is temperature-inverted, a change in temperature will cause one of the circuits to speed up and the other circuit to slow down. On the other hand, in response to a change in operating voltage, both the circuits will speed up or both the circuits will slow down. Therefore, by monitoring whether the circuits change speeds in opposite directions or in the same direction, a change in operating voltage can be distinguished from a change in operating temperature.

While typically one would wish to monitor both operating temperature and operating voltage, it is also possible to monitor only one of these conditions. For example, even if only the operating temperature is of interest, the monitoring circuit of the present technique is still useful, because the monitoring circuit can accurately distinguish changes in temperature from changes in voltage. Therefore, it is not essential for both operating temperature and operating voltage to be monitored.

To ensure that the temperature-inverted circuit displays temperature inversion, the circuit may be provided with at least some temperature-inverted transistors which switch state at switching speeds which increase as the operating temperature increases and decrease as the operating temperature decreases. Semiconductor technology libraries may include transistors which are characterised by whether they display temperature inversion. Therefore, it is possible to select appropriate transistor types to use for the temperature-inverted circuit. On the other hand, standard non-temperature-inverted transistors can be used for the non-temperature-inverted circuit.

The monitoring circuit may for example be formed using a 65 nm CMOS process node or smaller, since the temperature inversion effect is most likely for sub-65 nm nodes (an X nm process node is a technology capable of making transistors with a minimum gate length of X nm). More preferably, a 45 nm process node or smaller may be used, since the temperature inversion is stronger at such technologies.

Various circuit configurations can be used for the measuring circuit. In one example, the non-temperature-inverted circuit and temperature-inverted circuit may comprise ring oscillator circuits. The first and second signals may be oscillating signals within the ring oscillator circuits. The measuring circuits may measure as the first and second operating parameters either the oscillation frequency or the oscillation period of the signals in the ring oscillator circuits.

Alternatively, the non-temperature-inverted circuit and temperature-inverted circuit may comprise delay chains, for example a chain of inverters. The first and second operating parameters may comprise a propagation delay of the first and second signals in the delay chains.

As mentioned above, most recent CMOS technologies are well characterised and so it is possible to predict in advance of manufacture whether a particular type of transistor will display temperature inversion or not. However, as new technologies are developed then one may wish to construct a monitoring circuit using technology which has not yet been fully characterised. In this case, it may not be possible to predict whether a particular transistor will exhibit temperature inversion or not.

To address this issue, the monitoring circuit may comprise a plurality of candidate circuits comprising transistors of different characteristics. Each candidate circuit may propagate a signal, and an operating parameter indicative of the propagation speed of the signal can be measured for each candidate circuit. The first measuring circuit may select one of the candidate circuits as the non-temperature-inverted circuit and measure an operating parameter of the circuit as the first operating parameter. Similarly, the second measuring circuit may select another of the candidate circuits as the temperature-inverted circuit and measure an operating parameter of the selected candidate circuit as the second operating parameter. By providing a number of candidate circuits, then after the circuit has been manufactured some of the candidate circuits which are found to actually display temperature inversion or not can be selected as the temperature-inverted circuit or the non-temperature-inverted circuit. Hence, even if it is not known in advance whether temperature inversion will occur, the provision of multiple candidate circuits enables suitable non-inverted and inverted circuits to be found so as to enable the voltage and temperature effects to be distinguished.

The selection of the candidate circuits may be made in response to an external signal. Hence, an external device or a user of the monitoring circuit can supply an external signal to indicate to the monitoring circuit which of the candidate circuits should be selected as the non-temperature-inverted and temperature-inverted circuits respectively. For example, the external device or the user may observe the operating parameters generated by each candidate circuit in response to known changes in temperature and voltage, and select the pair of candidate circuits whose operating parameters exhibit the strongest divergence in response to a change in temperature.

A power controller may be provided to place in a power saving state those candidate circuits that are not selected as the non-temperature-inverted circuit or the temperature-inverted circuit. As the non-selected candidate circuits are not required for monitoring, power can be saved by placing these circuits in a power saving state. For example, power gating circuits may be used to cut off the power supply to the unused candidate circuits:

Another application of a monitoring circuit comprising multiple candidate circuits may be in an integrated circuit which uses dynamic voltage/frequency scaling (DVFS). Such integrated circuits may operate at a range of operating voltages, and it may be difficult to guarantee that a particular circuit will display temperature inversion or not at all the possible operating voltages. Therefore, plural candidate circuits may be provided, and different candidate circuits may be selected for different operating modes. For example, if a circuit can operate at 0.8V, 1V or 1.2V, a different set of candidate circuits may be selected for each voltage.

The monitoring circuit may comprise a bus interface for communicating with a bus of the integrated circuit being monitored. This allows the monitoring circuit to interface with the bus in the same way as other functional units of the integrated circuit. For example, the monitored operating parameters can be provided over the bus to a processor which can analyse the operating parameters measured by the monitoring circuit. Also, the monitoring circuit may act as a slave device connected to the bus, and a master device (such as the processor) may access the first and second operating parameters by issuing a read request to the monitoring circuit via the bus and bus interface. The monitoring circuit may also comprise one or more memory mapped control registers, and a master device may control the monitoring circuit by issuing a write request over the bus to write a control value to one of the control registers of the monitoring circuit, for example to reset a counter which measures the operating parameters, to set the precision with which the counter measures the operating parameters, or to enable or disable oscillation in a ring oscillator circuit.

The first and second operating parameters are indicative of the operating voltage and the operating temperature of the integrated circuit. If the monitoring circuit is not calibrated, then relative changes in the operating voltage and operating temperature can be determined from whether the first and second operating parameters both increase or both decrease (indicating a change in operating voltage) or whether one of the first and second operating parameters increases and the other decreases (indicating a change in operating temperature).

However, if the circuit is calibrated then the first and second operating parameters can be mapped to absolute values of the operating voltage and operating temperature. The calibration may account for process variations such as variations in temperature or humidity during manufacturing of the circuit, which can cause doping concentrations (and hence electron or hole mobility) in the semiconductor to vary. Process variations can lead to variation in the rate at which a transistors in different circuits or different regions of the same circuit switch between an on and off state. Also, in some parts of a chip p-type transistors could switch more rapidly than n-type transistors, or vice versa. For different process variations, different mappings between the operating parameters and the operating temperature and voltage can be established. Calibration enables characterisation of the process conditions for a particular monitoring circuit, so as to select an appropriate mapping for that monitoring circuit. The calibration may also account for factors other than process variation.

Typically, the calibration would be performed by a device external to the monitoring circuit. However, to assist with calibration the monitoring circuit may comprise a calibration data store for storing a calibration value for calibrating a mapping from the first and second operating parameters to the operating temperature and voltage. This allows another device to read the calibration value in order to identify which mapping should be used for determining absolute operating temperature or voltage values from the measured first/second operating parameters.

Viewed from another aspect, the present invention provides an integrated circuit comprising at least one monitoring circuit as described above. For example, monitoring circuits may be provided at various locations within the integrated circuit to monitor local voltage and temperature conditions.

The integrated circuit may comprise a mapping circuit for mapping a pair of values of the first and second operating parameters measured by the monitoring circuit to a corresponding pair of values of the operating temperature and operating voltage. The difference in temperature response between the temperature-inverted circuit and the non-temperature-inverted circuit enables each possible pair of potential first and second operating parameter values to be mapped to a unique corresponding pair of values of the operating temperature and operating voltage.

Although the mapping circuit may be provided within the monitoring circuit itself, it may be more efficient to provide the mapping circuit elsewhere in the integrated circuit, for example as part of a processor or as a specialised mapping unit. By providing the mapping circuit separately from the monitoring circuit, a single mapping circuit may be reused for multiple different monitoring circuits provided within the same integrated circuit.

The mapping circuit may comprise a lookup table which stores, for different pairs of values of the first and second operating parameters, corresponding pairs of values of the operating temperature and the operating voltage. Hence, the mapping circuit can index the lookup table using the first operating parameter value measured at the non-inverted circuit and the second operating parameter value measured at the inverted circuit, and output the corresponding pair of values of the temperature and voltage. The lookup table may be implemented either in hardware or software.

The mapping circuit may map the measured first and second operating parameter values to the corresponding temperature and voltage values using a mapping selected based on the calibration value stored in the calibration data store of the monitoring circuit. The calibration value may identify a type of process variation for the monitoring circuit, and the mapping circuit may select a different mapping for different process variation types. In one example, different lookup tables may be provided for each different process variation type. Alternatively, a common lookup table can be used for all process variation types, but a correction may be applied to the operating temperature and voltage values output by the lookup table, with a different correction being applied for each process variation type. Hence, the calibration value in the calibration data store enables the mapping circuit to generate accurate temperature and voltage measurements over a range of process variation types.

The integrated circuit may have a core region comprising functional circuitry, such as a processor, memory, coprocessor or graphics unit. The integrated circuit may also have a pad-ring region provided on the periphery of the core region. The pad-ring region can be used, for example, to provide input/output devices for communicating with other circuits, and to provide power supply connections for routing a power supply to the core region. Since circuit area is typically at a premium in the core region, it can be efficient to provide the monitoring circuits within the pad-ring region where there is typically more circuit area available.

More particularly, the monitoring circuits may be provided in the pad-ring region at corners of the integrated circuit. Typically, the corner regions of the pad-ring region are not as densely populated as other areas of the pad-ring region, because it can be difficult to route power supply lines or other communication lines to the core region from the corners of the pad-ring region. Therefore, it can be efficient to make use of this empty space by disposing the monitoring circuits in the corner regions of the pad-ring region. Also, if a monitoring circuit is placed at each corner of the integrated circuit, then this enables a temperature or voltage gradient across the integrated circuit to be determined.

At least one monitoring circuit may also be provided within the core region itself to provide visibility of the temperature and voltage conditions local to a particular circuit within the core region.

Viewed from another aspect, the present invention provides a monitoring circuit for monitoring an operating temperature and an operating voltage of an integrated circuit, said monitoring circuit comprising:

non-temperature-inverted circuit means for propagating a first signal with a propagation speed which decreases with increasing operating temperature and increases with increasing operating voltage;

temperature-inverted circuit means for propagating a second signal with a propagation speed which increases with increasing operating temperature and increases with increasing operating voltage;

first measuring means for measuring a first operating parameter indicative of said propagation speed of said first signal in said non-temperature-inverted circuit means; and second measuring means for measuring a second operating parameter indicative of said propagation speed of said second signal in said temperature-inverted circuit means;

wherein said first operating parameter and said second operating parameter are indicative of said operating temperature and said operating voltage.

Viewed another aspect, the present invention provides a method of monitoring at least one of an operating temperature and an operating voltage of an integrated circuit, said method comprising steps of:

measuring a first operating parameter indicative of a propagation speed of a first signal in a non-temperature-inverted circuit, said propagation speed decreasing with increasing operating temperature and increasing with increasing operating voltage;

measuring a second operating parameter indicative of a propagation speed of a second signal in a temperature-inverted circuit, said propagation speed increasing with increasing operating temperature and increasing with increasing operating voltage; and wherein said first operating parameter and said second operating parameter are indicative of said operating temperature and said operating voltage.

Viewed from a further aspect, the present invention provides a method of calibrating a monitoring circuit having a calibration data store as discussed above, the method comprising:

operating said monitoring circuit at a known operating temperature and operating voltage;

measuring the first operating parameter and the second operating parameter at said known operating temperature and operating voltage;

determining a calibration value based on said measured first and second operating parameters; and storing said calibration value to said calibration data store of said monitoring circuit.

As discussed above, by calibrating the monitoring circuit (for example to account for different process conditions) absolute values of the temperature and voltage can be determined using the first and second operating parameters measured by the inverted and non-inverted circuits. The calibration may be performed by measuring the first and second operating parameters while the monitoring circuit is operating at a known temperature and voltage. By analysing the measured first and second operating parameters (for example, comparing the parameters with values measured previously across a range of known process variation conditions), a calibration value can be determined which is stored to the calibration data store of the monitoring circuit, and can be referred to by a mapping circuit to determine how to map subsequently measured first and second operating parameters to absolute values of the operating temperature and operating voltage.

Further particular and preferred aspects of the present invention are set out in the accompanying independent and dependent claims. Features of the dependent claims may be combined with features of the independent claims as appropriate, and in combinations other than those explicitly set out in the claims.

The above, and other objects, features and advantages of this invention will be apparent from the following detailed description of illustrative embodiments which is to be read in connection with the accompanying drawings.

DESCRIPTION OF THE EMBODIMENTS

Figure 1:
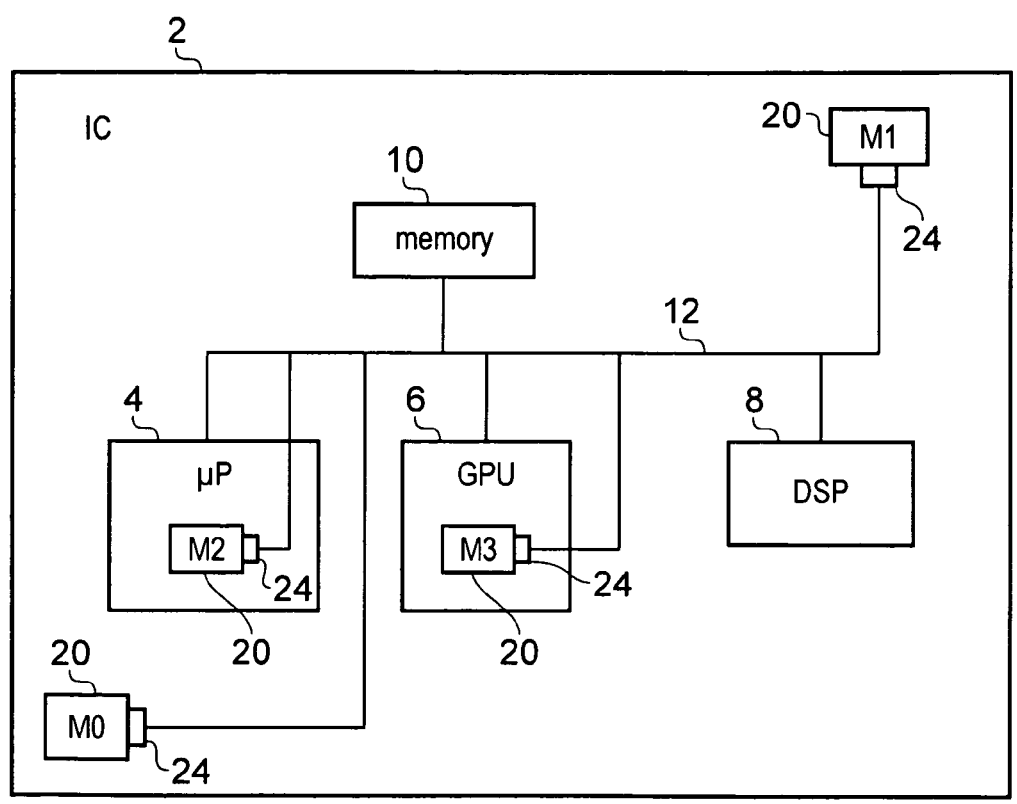
FIG. 1 schematically illustrates an integrated circuit comprising several monitoring circuits for monitoring at least one of an operating temperature and an operating voltage of the integrated circuit.

FIG. 1 schematically illustrates an integrated circuit 2 comprising a microprocessor 4, a graphics processor 6, a digital signal processor 8 and a memory 10. A bus 12 connects the various components of the integrated circuit 2. It will be appreciated that the arrangement shown in FIG. 1 is merely an example and that the integrated circuit may comprise circuits other than those indicated.

Various monitoring circuits 20 are disposed on the integrated circuit 2 for monitoring at least one of operating voltage and operating temperature at different locations of the integrated circuit 2. For example, some monitoring circuits M0, M1 may be provided at corners of the integrated circuit 2 to monitor a temperature gradient across the chip. Other monitoring circuits M2, M3 may be provided within functional units such as the processor 4 and the graphics processor 6 to identify local operating conditions. Each monitoring circuit 20 monitors an operating parameter representing a signal propagation speed within the monitoring circuit 20 and outputs the measured operating parameter onto the system bus 12 via a bus interface 24. The parameters output by the monitoring circuits 20 can then be analysed by the other devices such as the processor 4. The memory 10 may also store the parameters. By analysing the parameters, trends in operating temperature or operating voltage can be determined. Optionally, the operation of various elements of the integrated circuit 2 may be adjusted depending on the monitored operating parameters (for example, an error may be signalled if the temperature becomes too high or the voltage drops too low).

The monitoring circuits 20 may act as slave devices on the bus 12. A master device such as the processor 4 may access the operating parameters measured by the monitoring circuits 20 by issuing a read request to the desired monitoring circuit 20. For example, the monitoring circuit 20 may include a memory mapped register which stores the measured operating parameters, and which can be read by master devices connected to the bus 12 by issuing a read request targeting a particular memory address that is associated with the memory mapped register.

Also, the monitoring circuits 20 may include one or more memory mapped control registers for controlling various settings of the monitoring circuit 20. For example, a control register may control the precision with which the operating parameters are measured, or whether the monitoring circuit 20 is active or not. A master device may control the operation of the monitoring circuit 20 by issuing a write request via the bus 20 to write a control value into one of the control registers.

Figure 2:
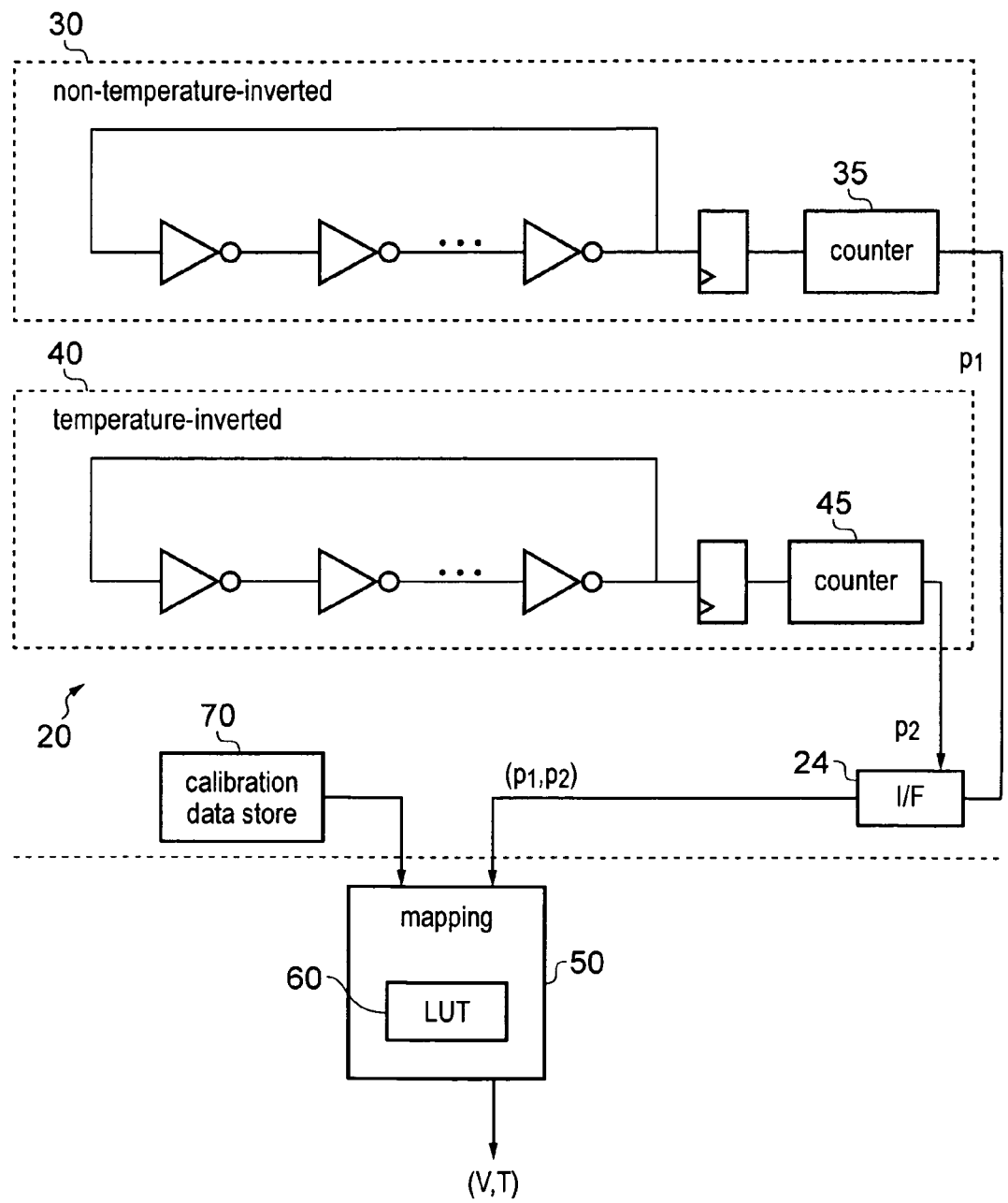
FIG. 2 illustrates an example monitoring circuit and a mapping circuit for mapping operating parameters generated by the monitoring circuit to temperature and voltage values.

FIG. 2 shows an example of a monitoring circuit 20. The monitoring circuit 20 comprises a non-temperature-inverted circuit 30 and temperature-inverted circuit 40. Both circuits 30, 40 comprise a ring oscillator which includes an odd number of inverters connected in a ring. While FIG. 2 illustrates three inverters in each ring oscillator, the number of inverters would typically be greater and may be any odd number. The signal at any given point of the ring oscillates between high and low values with a frequency and period dependent on the signal propagation speed through the inverters. Since the signal propagation speed depends on operating voltage and operating temperature, the oscillation frequency and oscillation period of the signal in the ring oscillator are parameters which can be used to track operating voltage and temperature.

A counter 35, 45 is provided with each ring oscillator to measure the oscillation frequency or oscillation period of the ring oscillator. For example, each counter 35, 45 may increment a count value each time the signal output by the ring oscillator changes state, and the frequency or period may be determined from how many state changes are detected in a specified time period. The counter 35 of the non-temperature-inverted circuit 30 acts as a first measuring circuit which measures a first operating parameter p1 (which is either the oscillation frequency or the oscillation period of the ring oscillator of the non-temperature-inverted circuit 30). Similarly, the counter 45 of the temperature-inverted circuit 40 acts as a second measuring circuit for measuring a second operating parameter p2 (which is either the oscillation frequency or the oscillation period of the ring oscillator of the temperature-inverted circuit 40).

The measured first and second operating parameters p1, p2 are output onto the bus 12 of the integrated circuit 2 via the bus interface 24 of the monitoring circuit 20. A mapping circuit 50 is connected to the bus, and may request output of the operating parameters p1, p2 by issuing a read request to the monitoring circuitry 20. In some embodiments, the mapping circuit 50 may be a dedicated mapping circuit, while in other embodiments the mapping unit may be implemented in software running on the microprocessor 4 or may be part of a different functional unit. The mapping circuit 50 receives the first and second operating parameters p1, p2 measured by the counters 35, 45. The mapping circuit 50 refers to a lookup table 60 to map the operating parameters p1, p2 to corresponding values of the operating voltage V and operating temperature T. The lookup table will described later with respect to FIG. 7.

The monitoring circuit 20 has a calibration data store 70 which stores at least one calibration value which identifies which mapping should be used by the mapping circuit 50 for mapping between the operating parameters p1, p2 and the operating voltage and temperature values V, T. The monitoring circuit 20 can be calibrated during production of the integrated circuit 2 to account for factors such as manufacturing condition variations which cause different process variation effects in the integrated circuit. The calibration data store 70 may comprise a non-volatile memory which does not require a power supply to maintain its data.

Although not essential, FIG. 2 shows an example in which the circuit arrangement of the non-temperature-inverted circuit 30 and temperature-inverted circuit 40 is the same. However, the non-temperature-inverted circuit 30 and temperature-inverted circuit 40 behave differently in response to temperature changes because different transistor types are used to form the inverters of the ring oscillators.

Figure 3:
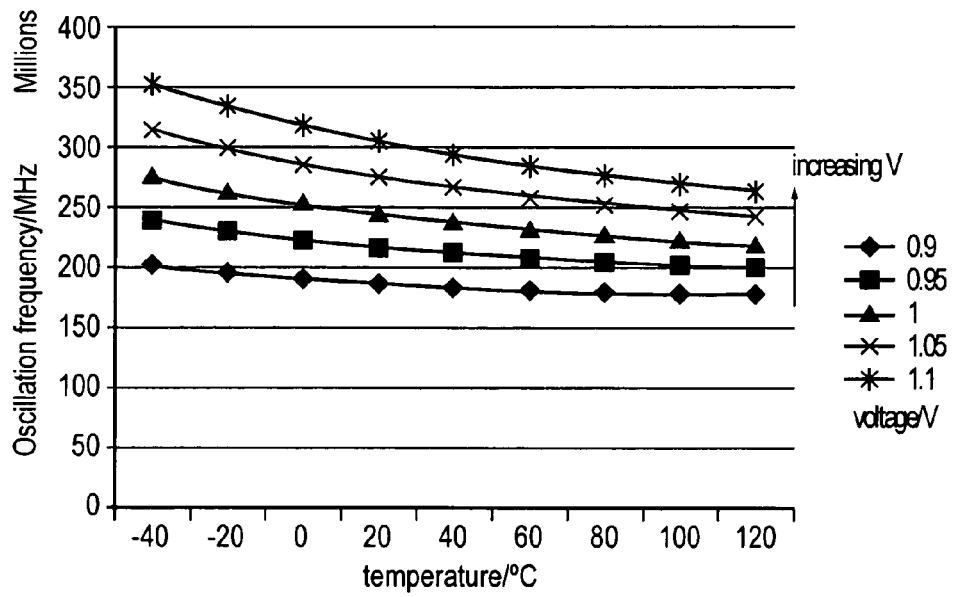
FIG. 3 is a graph showing an example of the variation of an operating parameter with voltage and temperature in a non-temperature-inverted circuit.

In the non-temperature-inverted circuit 30, transistors which do not display temperature-inversion are used. FIG. 3 shows simulation results illustrating the way in which oscillation frequency (which is an example of the operating parameter p1) varies with temperature and voltage for the non-temperature-inverted circuit 30. As shown in FIG. 3, the oscillation frequency decreases as temperature increases, and increases as voltage increases. This is the traditional, non-temperature-inverted, relationship between temperature and transistor switching speed.

Figure 4:
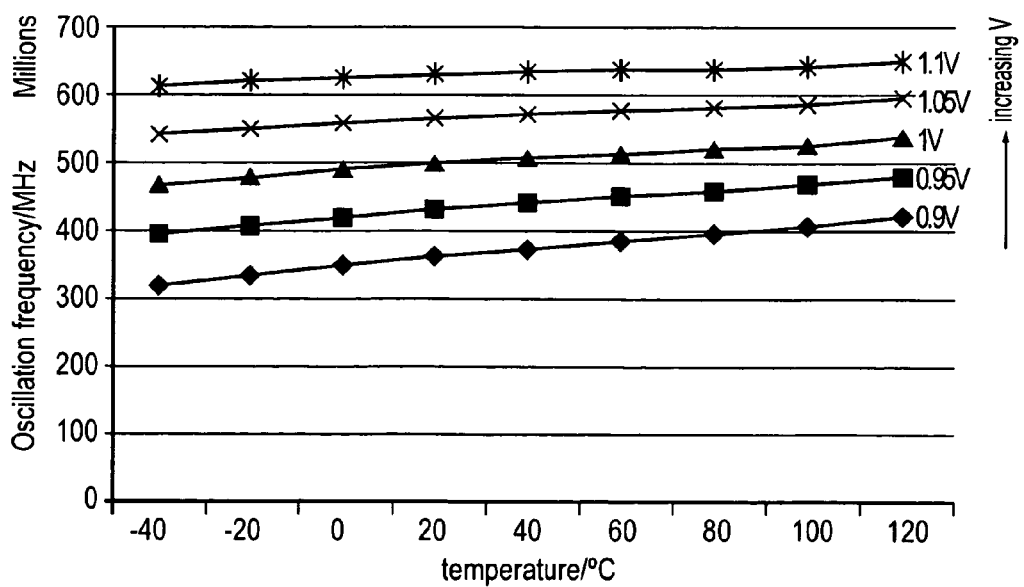
FIG. 4 is a graph showing an example of the variation of an operating parameter with voltage and temperature in a temperature-inverted circuit.

On the other hand, at least some transistors of the temperature-inverted circuit 40 display temperature-inversion. It is not essential for all the transistors to display temperature-inversion, as long as the circuit as a whole speeds up in response to a temperature increase. FIG. 4 shows simulation results showing the response of the temperature-inverted circuit 40 to changes in temperature and voltage. As shown in FIG. 4, for the temperature-inverted circuit the oscillation frequency increases as temperature increases and also increases as voltage increases.

In the simulated examples of FIGS. 3 and 4, the non-temperature-inverted circuit 30 comprises medium-oxide "EG" devices and the temperature-inverted circuit 40 comprises high threshold voltage (HVT) inverters. Both circuits are under-driven to the same 1V core supply and both devices are constructed from 32 nm technology. It will be appreciated that the particular technology used for the non-temperature-inverted circuit 30 and temperature-inverted circuit is not important, provided that one circuit displays temperature inversion and the other does not. Most technology libraries will specify for different transistor types whether the transistor will exhibit inversion or not. Also, the supply voltage applied to a given transistor will control whether inversion occurs, and this can be exploited to design temperature-inverted circuits 40 in which temperature inversion occurs and non-temperature-inverted circuits 30 in which temperature inversion cannot occur.

As shown in FIGS. 3 and 4 the circuits 30, 40 will both speed up or both slow down in response to a change in operating voltage, but will respond in different ways when there is a change in temperature. This enables a variation in voltage to be distinguished from the variation in temperature. This is shown in the graph of FIG. 5 which clearly shows the way in which the inverted circuit and the non-inverted circuit respond in different ways to a change in temperature.

Figure 5:
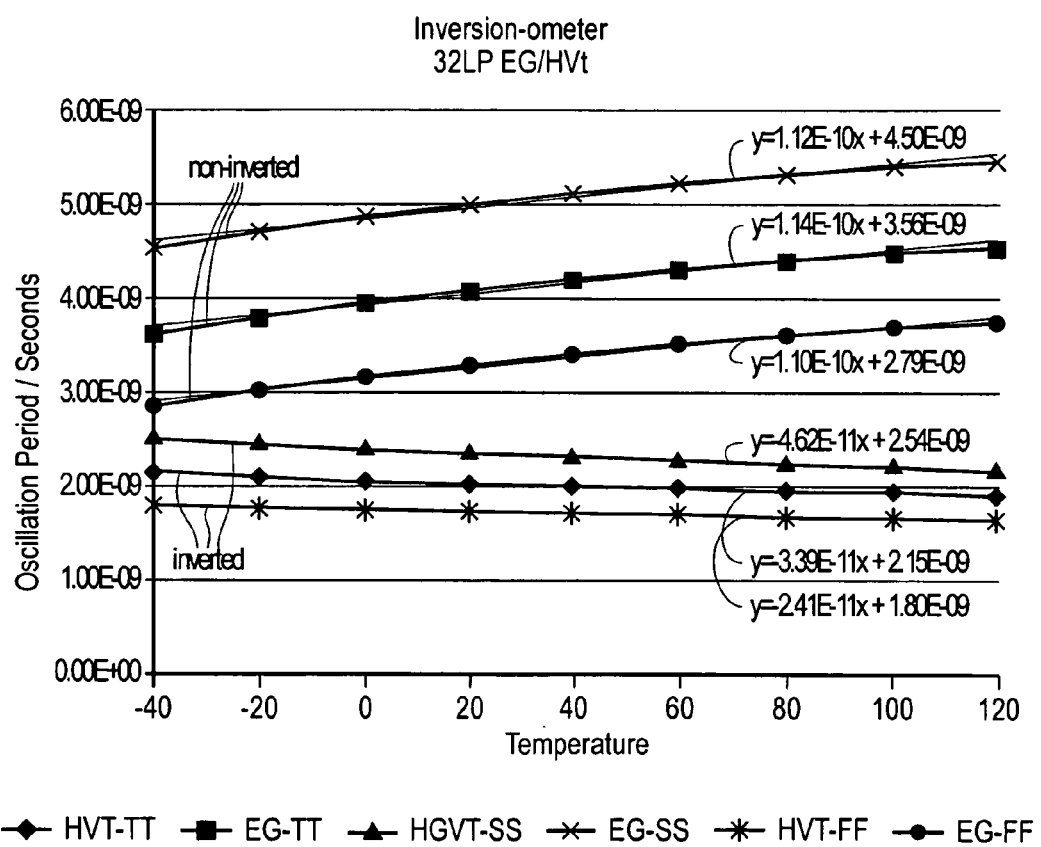
FIG. 5 illustrates the divergence between the response of a non-temperature-inverted circuit and a temperature-inverted circuit to changes in temperature.

Note that FIG. 5 shows an example where the oscillation period of the ring oscillator circuits is measured as the first and second operating parameters rather than the operating frequency. Hence, in FIG. 5, the oscillation period of the inverted circuit 40 decreases with increasing temperature, indicating an increase in operating speed of the circuit (since a shorter oscillation period represents a faster propagation speed). Conversely, the oscillation period of the non-inverted circuit 30 increases with increasing temperature, indicating that the non-inverted circuit 30 is slowing down as the temperature increases.

FIG. 5 also shows the way in which process variation changes the mapping between the measured operating parameter and the operating temperature. FIG. 5 illustrates an example simulation of SS (slow n-type, slow p-type), FF (fast n-type, fast p-type), and TT (typical n-type, typical p-type) corner cases, although it will be appreciated that real semiconductors may have a continuous distribution between these extreme cases, and may also have n-type and p-type devices which have different switching speeds. FIG. 5 shows that the trend in the variation of the operating parameter with temperature is substantially the same for each process corner, but with different absolute values of the oscillation period measured at the same temperature for each corner. As shown in FIG. 5, lines or curves can be fitted to the observed values for each corner. Similar lines/curves can be determined for other process variation types lying between the corner cases shown in FIG. 5. The parameters of these lines/curves can then be used to convert the mapping of a common lookup table 60 of the mapping circuit 50 into different mappings for each process variation type, with the particular mapping for a given monitoring circuit being selected based on the calibration value stored in the calibration store 70 of the monitoring circuit.

Figure 6:
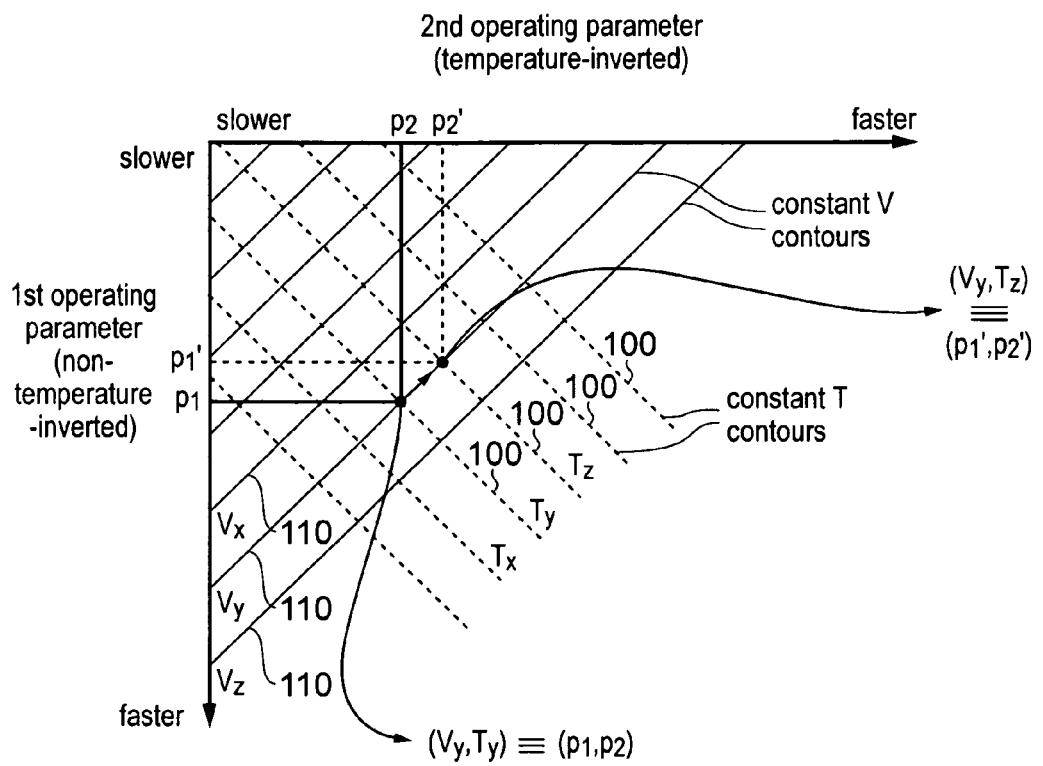
FIG. 6 schematically illustrates why the operating parameters of the non-temperature-inverted circuit and temperature-inverted circuit can be mapped to unique corresponding values of the operating voltage and operating temperature.

The divergent behaviour shown in FIGS. 3-5 of the inverted and non-inverted circuits enables a pair of operating parameters measured in the two circuits 30, 40 to be mapped to a corresponding pair of operating voltage and operating temperature values. FIG. 6 illustrates graphically why each pair of operating parameters maps to a unique pair of voltage and temperature values. The potential operating parameter values are illustrated on the x and y axes of FIG. 6. Since the operating parameters may be either an oscillation frequency or an oscillation period and so may scale either proportionally or inversely with the propagation speed of the monitoring circuit, the absolute values of the operating parameters are not indicated, and instead the axis are labelled with slower and faster, representing slower and faster signal propagation speeds.

For both the non-temperature-inverted circuit 30 and temperature-inverted circuit 40, the switching speed increases as the operating voltage increases if the operating temperature remains constant. This is represented in FIG. 6 by constant-temperature contour lines 100. The contour lines 100 indicate that when the temperature is held constant, then if the first operating parameter indicates a faster switching speed, the second operating parameter must also indicate a faster switching speed, since the voltage change causes both circuits to speed up.

On the other hand, if the voltage remains constant, then an increase in temperature would cause a slower switching speed in the non-temperature-inverted circuit 30 and a faster switching speed in the temperature-inverted circuit 40. This is represented in FIG. 6 by constant-voltage contour lines 110. The direction of the constant-voltage contour lines 110 is different to the constant-temperature contour lines 100 because the first and second operating parameters tend in opposite directions in response to a temperature change. The contour lines 110 indicate that if the voltage is held constant, then when one of the first and second operating parameters indicates an increase in speed, the other parameter must indicate a decrease in speed.

As can be seen in FIG. 6, for any given value p1 of the first operating parameter and value p2 of the second operating parameter, a corresponding pair of operating voltage and operating temperature values can be identified where the corresponding constant-temperature contour line 100 and constant-voltage contour line 110 cross. This pair of voltage/temperature values is unique to that pair of operating parameter values p1, p2, since any change in voltage or temperature would cause the operating parameters to move along the contour lines to different values.

FIG. 6 shows an example where voltage $V_y$ and temperature $T_y$, the operating parameters are measured to be $p_1, p_2$. If the temperature now increases from $T_y$ to $T_z$ while the voltage remains at $V_y$, then the operating parameter values effectively move along the $V_y$ contour line 110 to new values $p_1', p_2'$ which correspond to the point at which the $T_z$ contour 100 crosses the $V_y$ contour 110. Similarly, if the temperature and voltage both changed simultaneously then the operating parameters would move to different values corresponding to the point at which a different pair of voltage/temperature contour lines cross.

Figure 7:
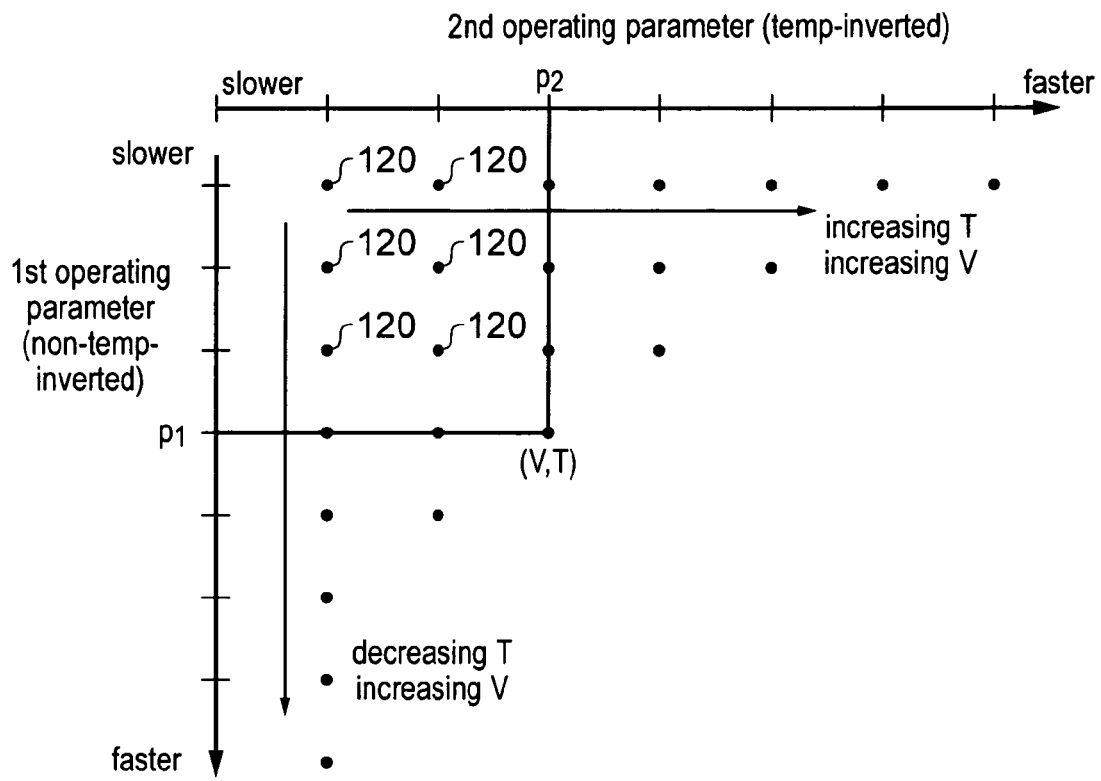
FIG. 7 shows an example of looking up operating voltage and temperature values using a two-dimensional lookup table.

Therefore, for any given circuit there is a unique relationship between a pair of first/second operating parameter values and a corresponding pair of voltage and temperature values. This enables a two-dimensional lookup table to be used for mapping the operating parameters p1, p2 measured by the circuit 30, 40 to the operating voltage and temperature values V, T. FIG. 7 illustrates an example explaining the lookup table 60. The lookup table stores an array of data elements 120. Each data element 120 is indexed by a pair of first and second operating parameter values and identifies the corresponding pair of voltage and temperature values. For example, if the non-temperature-inverted circuit 30 measures a first operating parameter p1 and the temperature-inverted circuit 40 measures second operating parameter p2, then the lookup table shown in FIG. 7 would return the voltage and temperature values V, T stored in the element indexed by parameters p1 and p2. FIG. 7 also shows the direction in which the temperature and voltage values would increase or decrease from element to element within the lookup table. This variation in values corresponds to the trend indicated by the contour lines 100, 110 shown in FIG. 6 (for example, there may be a set of elements 120 corresponding to the position of a constant-temperature contour 100 which each store the same temperature value).

The lookup table stores a finite number of elements 120. If the lookup table does not have enough data elements 120 to cover all possible operating parameter values measurable by the measuring circuits 35, 45, then voltage/temperature values for an operating parameter value for which no element 120 is stored may be determined by using the element 120 for the nearest operating parameter value, or by interpolating between the voltage/temperature values stored in the elements 120 for nearby operating parameter values.

FIG. 2 shows an example in which the monitoring circuit uses ring oscillators to measure an oscillation frequency or oscillation period which indicates the propagation speed within the circuit. However, it is also possible to use other kinds of monitoring circuit.

Figure 8:
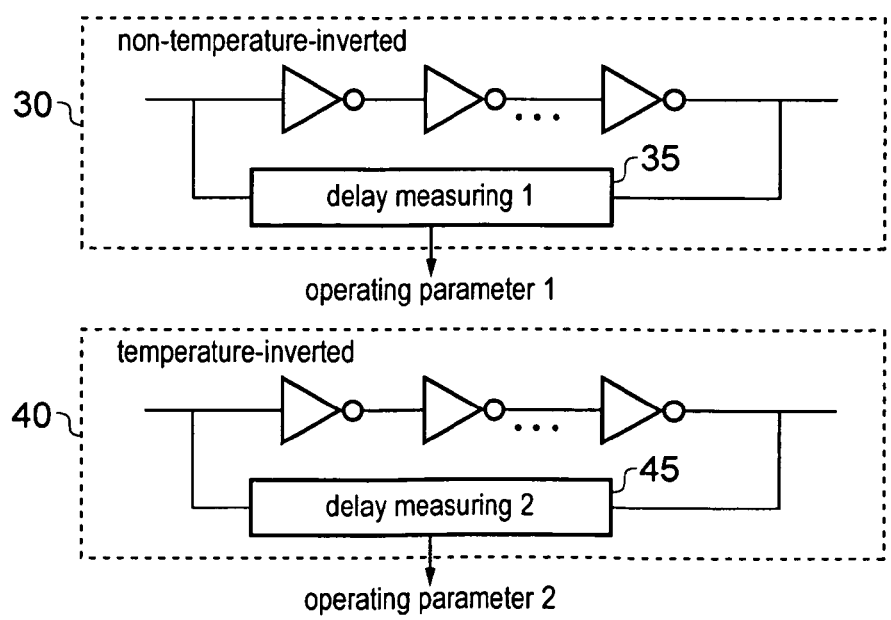
FIG. 8 illustrates a second example of the monitoring circuit.

For example, FIG. 8 shows an example in which the non-temperature-inverted circuit 30 and temperature-inverted circuit 40 each comprise a delay chain of inverters.

The measuring circuits 35, 45 in this example measure the propagation delay of a signal passing through a chain of inverters. While FIG. 8 illustrates three inverters in each chain, it will be appreciated that there may be more converters and that any number of inverters may be provided. In FIG. 8, a longer signal propagation delay indicates a slower signal propagation speed, so the values of the lookup table 60 would need to be adjusted to account for the change in relationship between the measured operating parameters and the voltage/temperature values. Otherwise, the principle of operation of the monitoring circuit is the same as discussed above.

Figure 9:
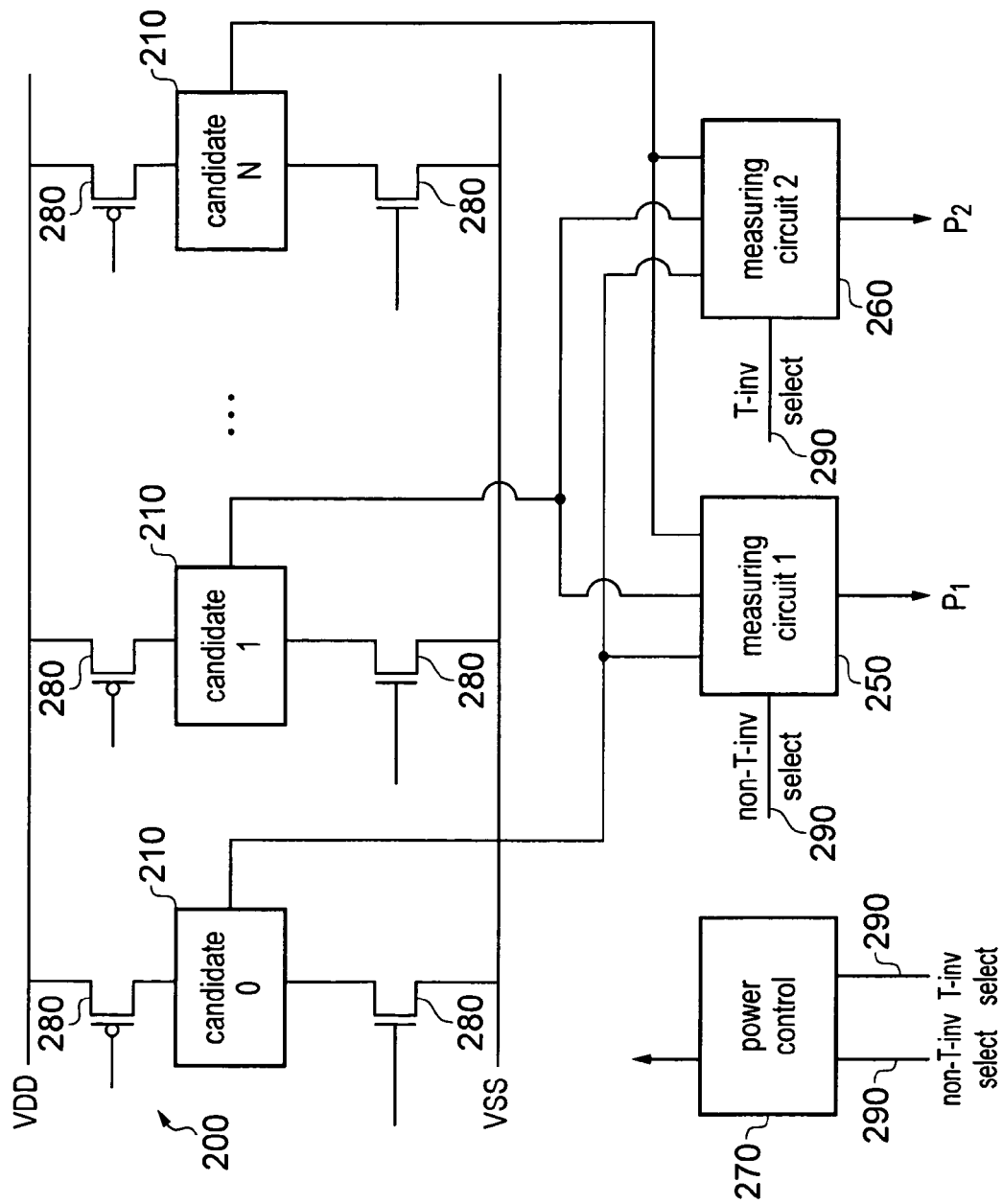
FIG. 9 shows another example of the monitoring circuit in which several candidate circuits are provided for selection as the non-temperature-inverted and temperature-inverted circuits.

FIG. 9 shows another example of a monitoring circuit 100 in which a number of candidate circuits 210 are provided, each of which can potentially be used as either the non-temperature-inverted circuit 30 or the temperature-inverted circuit 40. Each candidate circuit 210 may for example comprise a ring oscillator as shown in FIG. 2 or a delay chain as shown in FIG. 8. First and second measuring circuits 250, 260 are provided to measure the operating parameter of the non-temperature-inverted circuit 30 and temperature-inverted circuit 40 respectively.

The first measuring circuit 250 selects one of the candidate circuits 210 to be used as the non-temperature-inverted circuit, and the second measuring circuit 260 selects another of the candidate circuits 210 to be used as the temperature-inverted circuit. This enables the candidate circuits 210 to be analysed after they have been manufactured to determine whether they display temperature inversion or not. The pair of candidate circuits 20 which display the most divergent response to temperature changes can then be selected as the non-temperature-inverted circuit and temperature-inverted circuit to be measured by the respective measuring circuits 250, 260. This technique enables a monitoring circuit to be implemented even in technologies in which it is not clear whether a particular circuit will exhibit temperature inversion.

To reduce power consumption, a power controller 270 is provided for placing non-selected candidate circuits 210 in a low power state. Power gating circuits 280 are provided for each candidate circuit 210 to selectively isolate each candidate circuit 210 from the VDD and VSS supply lines. This means that the provision of additional candidate circuits 210 has no real impact on the power consumption of the integrated circuit 2 once the circuit has entered regular operation, since only two of the candidate circuits 210 remain active.

An external signal 290 is supplied to the monitoring circuits 250, 260 and the power controller 270 to identify which candidate circuits 210 should be used as the non-temperature-inverter circuit and the temperature-inverter circuit respectively. In this way, an external device or a system operator can verify that the circuits are actually displaying temperature inversion or not before instructing the measuring circuits 250, 260 and power controller 270 to select the appropriate candidate circuits 210 and to power down the other circuits 210.

Figure 10:
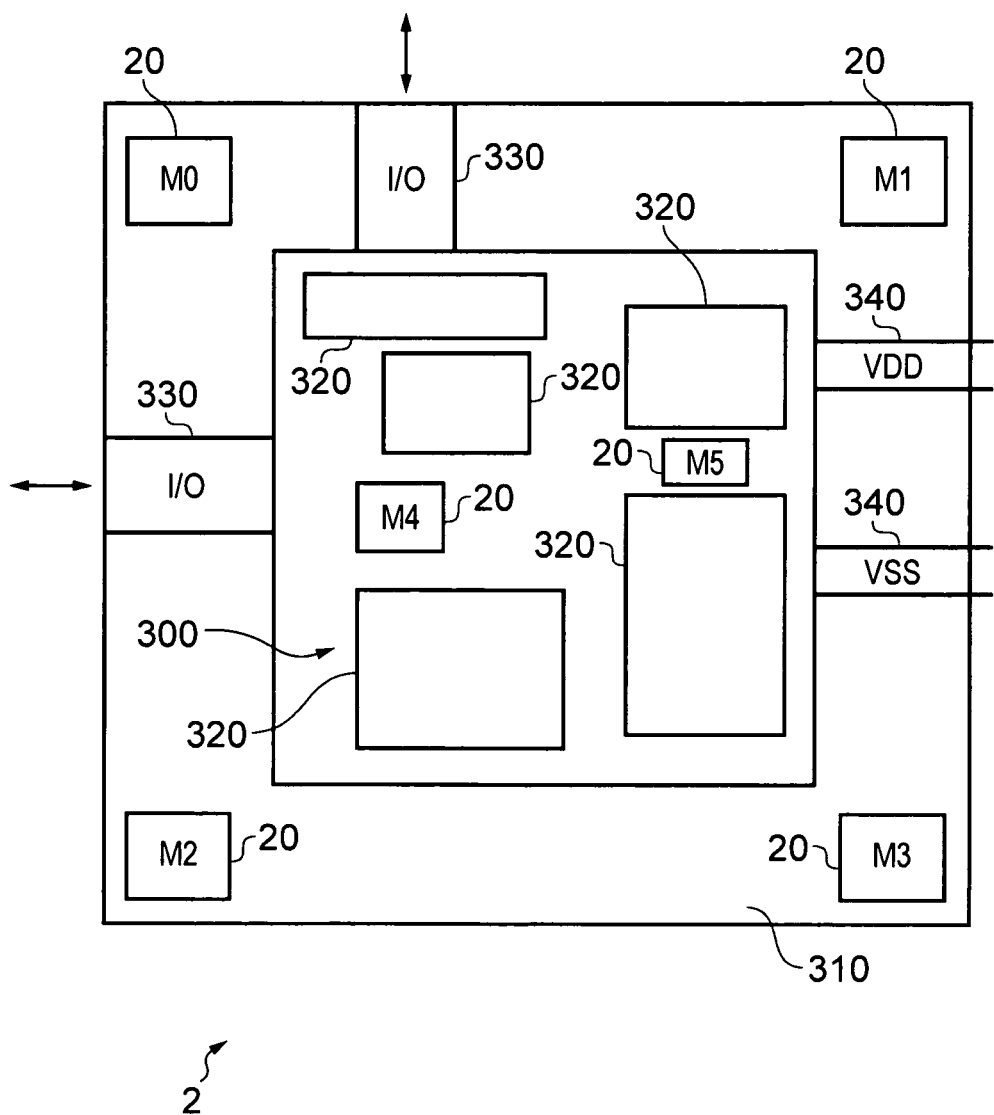
FIG. 10 illustrates an integrated circuit having a core region and a pad-ring region.

FIG. 10 shows an example of the arrangement of monitoring circuits 20 on an integrated circuit 2. The integrated circuit 2 may comprise a core region 300 and a pad-ring region 310 surrounding the core region 300. Typically the core region 300 would include the functional units 320 of the integrated circuit 2, such as a processor, a memory, a digital signal processor, a direct memory access controller, and so on. On the other hand, the pad-ring region 310 is typically used for providing input/output ports 330 for communicating with other circuits such as peripheral devices, or for routing power supply lines 340. There is typically more circuit area available in the pad-ring region than in the core ring region 300, and so the monitoring circuits 20 may conveniently be disposed in the pad-ring region 310. Some monitoring circuits 20 may also be provided in the core region 300 to monitor the conditions local to target units 320 of the core region 300.

The corner regions of the pad-ring region 310 are usually less densely packed than other regions which directly adjoin the sides of the core region 300, because it can be difficult to route power supply lines or input/output lines to the core region 300 from the corners of the chip. Therefore, the monitoring circuitry may be placed in the corner regions which is unlikely to be used for other purposes. Also, by providing different monitoring circuits on different sides of the chip, temperature and voltage gradients can be determined.

Figure 11:
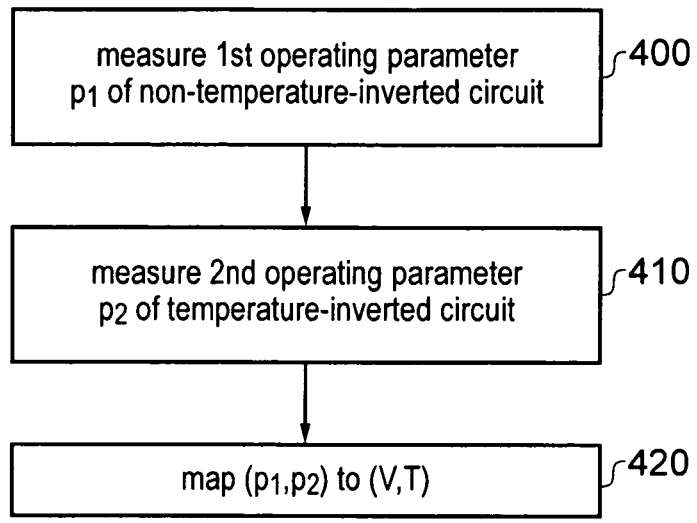
FIG. 11 illustrates a method of monitoring at least one of an operating temperature and operating voltage of an integrated circuit.

FIG. 11 illustrates a method of monitoring an operating voltage and/or an operating frequency of an integrated circuit. At step 400, the monitoring circuit measures a first operating parameter $p_1$ of the non-temperature-inverted circuit 30. At step 410 the monitoring circuit 40 measures a second operating parameter $p_2$ of the temperature-inverted circuit 40. While steps 400 and 410 are shown in series, these may also be performed in parallel with one another. The first and second operating parameters p1, p2 are representative of the propagation speed of signals within the non-temperature-inverted circuit 30 and temperature-inverted circuit 40.

The operating parameters p1, p2 are then output by the monitoring circuit 20 to the mapping unit 50, which at step 420 uses the lookup table 60 to map the pair of first and second operating parameter values p1, p2 to a corresponding pair of voltage and temperature values V, T. If only one of the voltage and temperature values is of interest then the other one can be ignored.

If the monitoring circuit 20 has been calibrated for process variation, then at step 420 the mapping may perform a different mapping depending on which process variation type has been identified. This can be done either by providing separate lookup tables 60 corresponding to each process variation type or by post-processing the voltage and temperature values generated by the lookup table using a variable transformation which depends on the process variation types identified by the calibration data stored in the calibration data store 70. For example, as shown in FIG. 5, it is possible to determine a numerical relationship between the operating parameter value and the temperature for each process variation type, and a similar relationship can be generated for the voltage dependency. Hence, these numerical parameters can be used to convert to the operating temperature/voltage values for the relevant process variation type. In this way, the storage capacity for storing the lookup table can be conserved by using a common lookup table for each process variation type.

Figure 12:
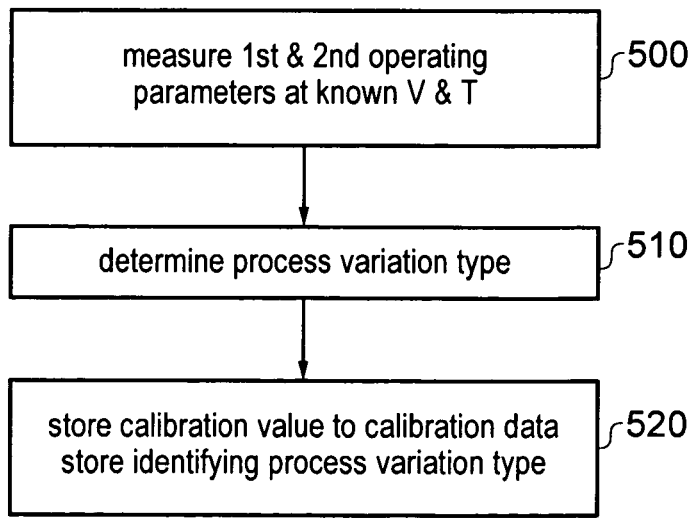
FIG. 12 illustrates a method of calibrating a monitoring circuit.

FIG. 12 shows a method of calibrating the monitoring circuit. At step 500, the first and second operating parameters of the non-inverted and inverted circuits 30, 40 are measured at a known operating voltage V and operating temperature T. At step 510, the process variation type of the monitoring circuit is determined by comparing the measured operating parameters with previously calculated curves such as shown in FIG. 5 and determining from the relationship between the known voltage/temperature and the measured parameters which of the process variation types is the relevant one for the monitoring circuit being calibrated. At step 520, a calibration value indicating the determined process variation type is determined and stored to the calibration data store.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A monitoring circuit for monitoring at least one of an operating temperature and an operating voltage of an integrated circuit, said monitoring circuit comprising:
    a non-temperature-inverted circuit configured to propagate a first signal with a propagation speed which decreases with increasing operating temperature and increases with increasing operating voltage;
    a temperature-inverted circuit configured to propagate a second signal with a propagation speed which increases with increasing operating temperature and increases with increasing operating voltage;
    a first measuring circuit configured to measure a first operating parameter indicative of said propagation speed of said first signal in said non-temperature-inverted circuit; and
    a second measuring circuit configured to measure a second operating parameter indicative of said propagation speed of said second signal in said temperature-inverted circuit;
    wherein said first operating parameter and said second operating parameter are indicative of said operating temperature and said operating voltage.

2. The monitoring circuit according to claim 1, wherein said temperature-inverted circuit comprises transistors configured to propagate said second signal, said transistors including at least some temperature-inverted transistors configured to switch states at switching speeds which increase as said operating temperature increases and decrease as said operating temperature decreases.

3. The monitoring circuit according to claim 1, wherein said non-temperature-inverted circuit comprises a first ring oscillator circuit and said first signal is an oscillating signal of said first ring oscillator circuit; and
said temperature-inverted circuit comprises a second ring oscillator circuit and said second signal is an oscillating signal of said second ring oscillator circuit.

4. The monitoring circuit according to claim 3, wherein said first operating parameter comprises an oscillation frequency or oscillation period of said first signal and said second operating parameter comprises an oscillation frequency or oscillation period of said second signal.

5. The monitoring circuit according to claim 1, wherein said non-temperature-inverted circuit comprises a first delay chain configured to propagate said first signal, said first operating parameter comprising a propagation delay of said first signal in said first delay chain; and
said temperature-inverted circuit comprises a second delay chain configured to propagate said second signal, said second operating parameter comprising a propagation delay of said second signal in said second delay chain.

6. The monitoring circuit according to claim 1, comprising a plurality of candidate circuits configured to propagate a signal, said plurality of candidate circuits comprising transistors of different characteristics;
said first measuring circuit is configured to select one of said candidate circuits as said non-temperature-inverted circuit and to measure an operating parameter of the selected candidate circuit as said first operating parameter; and
said second measuring circuit is configured to select another of said candidate circuits as said temperature-inverted circuit and to measure an operating parameter of the selected candidate circuit as said second operating parameter.

7. The monitoring circuit according to claim 6, wherein said first measuring circuit and said second measuring circuit are configured to select said non-temperature-inverted circuit and said temperature-inverted circuit in response to an external signal.

8. The monitoring circuit according to claim 6, comprising a power controller configured to control a power supply to said plurality of candidate circuits, wherein said power control circuit is configured to place in a power saving state at least one candidate circuit that is not selected by said first measuring circuit or said second measuring circuit.

9. The monitoring circuit according to claim 1, comprising a bus interface for communicating with a bus of said integrated circuit.

10. The monitoring circuit according to claim 1, comprising a calibration data store configured to store a calibration value for calibrating a mapping from said first operating parameter and said second operating parameter to said operating temperature and said operating voltage.

11. A method of calibrating a monitoring circuit according to claim 10, said method comprising:
operating said monitoring circuit at a known operating temperature and operating voltage;
measuring said first operating parameter and said second operating parameter at said known operating temperature and operating voltage;
determining a calibration value based on said measured first and second operating parameters; and
storing said calibration value to said calibration data store of said monitoring circuit.

12. An integrated circuit comprising at least one monitoring circuit according to claim 1.

13. The integrated circuit according to claim 12, comprising a mapping circuit configured to map a pair of values of said first operating parameter and said second operating parameter measured by said at least one monitoring circuit to a corresponding pair of values of said operating temperature and said operating voltage.

14. The integrated circuit according to claim 13, wherein said mapping circuit comprises a lookup table configured to store, for different pairs of values of said first operating parameter and said second operating parameter, corresponding pairs of values of said operating temperature and said operating voltage.

15. The integrated circuit according to claim 13, wherein said at least one monitoring circuit comprises a calibration data store configured to store a calibration value; and
said mapping circuit is configured to map said pair of values of said first operating parameter and said second operating parameter to said corresponding pair of values of said operating temperature and said operating voltage using a mapping selected in dependence on said calibration value.

16. An integrated circuit according to claim 12, comprising:
a core region comprising functional circuitry; and
a pad-ring region provided on the periphery of the core region;
wherein said pad-ring region comprises at least one said monitoring circuit.

17. An integrated circuit according to claim 16, wherein a plurality of said monitoring circuits are provided in said pad-ring region at corners of said integrated circuit.

18. An integrated circuit according to claim 16, wherein said core region also comprises at least one said monitoring circuit.

19. A monitoring circuit for monitoring an operating temperature and an operating voltage of an integrated circuit, said monitoring circuit comprising:
non-temperature-inverted circuit means for propagating a first signal with a propagation speed which decreases with increasing operating temperature and increases with increasing operating voltage;
temperature-inverted circuit means for propagating a second signal with a propagation speed which increases with increasing operating temperature and increases with increasing operating voltage;
first measuring means for measuring a first operating parameter indicative of said propagation speed of said first signal in said non-temperature-inverted circuit means; and
second measuring means for measuring a second operating parameter indicative of said propagation speed of said second signal in said temperature-inverted circuit means;
wherein said first operating parameter and said second operating parameter are indicative of said operating temperature and said operating voltage.

20. A method of monitoring at least one of an operating temperature and an operating voltage of an integrated circuit, said method comprising steps of:
measuring a first operating parameter indicative of a propagation speed of a first signal in a non-temperature-inverted circuit, said propagation speed decreasing with increasing operating temperature and increasing with increasing operating voltage;

measuring a second operating parameter indicative of a propagation speed of a second signal in a temperature-inverted circuit, said propagation speed increasing with increasing operating temperature and increasing with increasing operating voltage; and wherein said first operating parameter and said second operating parameter are indicative of said operating temperature and said operating voltage.

* * * * *